United States Patent [19]

Luise

[11] Patent Number: 4,769,403

[45] Date of Patent: Sep. 6, 1988

[54] THERMOPLASTIC POLYARYLATE COMPOSITIONS

[75] Inventor: Robert R. Luise, Boothwyn, Pa.

[73] Assignee: E. I. Du Pont de Nemours and Company, Wilmington, Del.

[21] Appl. No.: 920,328

[22] Filed: Oct. 17, 1986

[51] Int. Cl.$^4$ .............................................. C08L 67/02
[52] U.S. Cl. .................................... 523/435; 524/410; 525/133; 525/151
[58] Field of Search ........................ 523/435; 524/410; 525/133, 151

[56] References Cited

U.S. PATENT DOCUMENTS

| | | | |
|---|---|---|---|
| 3,897,389 | 7/1975 | Touval | 524/410 |
| 4,035,333 | 7/1977 | Kamada | 524/410 |
| 4,338,243 | 7/1982 | Hecht | 524/287 |
| 4,348,500 | 9/1982 | Robeson | 525/65 |

FOREIGN PATENT DOCUMENTS

| | | | |
|---|---|---|---|
| 48483 | 3/1982 | European Pat. Off. | 524/435 |
| 54-158453 | 12/1979 | Japan . | |

*Primary Examiner*—Patricia Short

[57] ABSTRACT

Thermoplastic polyarylate compositions having improved flame retardancy consisting essentially of polyacrylate, epoxy-containing polymer, brominated polystyrene and sodium antimonate.

11 Claims, No Drawings

THERMOPLASTIC POLYARYLATE COMPOSITIONS

TECHNICAL FIELD

This invention relates to certain thermoplastic polyarylate compositions which are characterized by improved flame retardancy and by reduced dripping in flammability testing. Polyarylates are generally understood to include polymers derived from the reaction of one or more dihydric phenols with one or more aromatic dicarboxylic acids. The thermoplastic polyarylate compositions of the present invention include as additional ingredients a polymer containing epoxide functionality and a flame retardant comprising a mixture of brominated polystyrene and sodium antimonate. The compositions of the present invention will include multi-phase blends of the above ingredients and, since two or more of the above ingredients may react or interact with each other under melt conditions, the compositions of the present invention will also include the reaction products of the above ingredients.

The compositions of the present invention are useful in preparing semi-finished and finished articles by any of the techniques commonly used with thermoplastic materials, e.g., compression molding, injection molding, extrusion, blow molding, rotational molding, melt spinning, stamping and thermoforming. Finished products made from such compositions possess extremely desirable physical properties, including high stiffness, strength and solvent resistance. In addition, in certain applications, such as in electrical housings and connectors, it is necessary or desirable to have thermoplastic compositions with superior flame-retardancy.

BACKGROUND ART

U.S. Pat. No. 4,348,500, granted Sept. 7, 1982 to Robeson et al. discloses polyarylate compositions having improved hydrolytic stability comprising a polyarylate, an aliphatic polyester, an epoxide, and optionally a thermoplastic polymer selected from aromatic polycarbonates, styrene polymers, poly(alkyl acrylates), polyurethanes, vinyl chloride polymers, poly(arylethers), copolyetherester block polymers, and polyhydroxy ethers.

Japanese Patent Publication No. 54-158453, published to Fukushima et al. Dec. 14, 1979, discloses polyarylates melt blended with acrylate cooplymers containing a glycidyl (meth)acrylate moiety, where such polymer blends have improved stability upon exposure to hot water.

Neither of the references listed and discussed above disclose the flame-retardant blends of the present invention.

DISCLOSURE OF THE INVENTION

This invention relates to certain thermoplastic polyarylate compositions which are characterized by improved flame retardancy and by reduced dripping in flammability testing. More specifically, the compositions show an unexpected improvement in flame retardancy as measured by a standard UL94 flammability test. This improvement is unexpected because the UL94 flammability rating of polyarylate is improved to the maximum rating by the combination of the epoxide containing polymer and the flame retardant mixture of brominated polystyrene and sodium antimonate, and not by the above-recited flame retardant mixture alone. This is in spite of the fact that the polymer containing epoxide functionality, when used alone with the polyarylate, actually diminishes the UL94 rating of polyarylate, as would be expected.

More specifically, this invention comprises a blend of
 (a) at least one polyarylate derived from at least one dihydric phenol and at least one aromatic dicarboxylic acid;
 (b) at least one polymer containing epoxide functionality;
 (c) tri-brominated polystyrene; and
 (d) sodium antimonate.

The compositions of the present invention will include multi-phase melt blends of the above ingredients, and, since two or more of the above ingredients may react or interact with each other, the compositions of the present invention will also include melt blends of the reaction products thereof.

Component (a) polyarylate will comprise 80-92 weight percent, preferably 82-90 weight percent, and most preferably 85-87 weight percent, of the composition. Component (b) epoxide containing polymer will comprise 5-10 weight percent and preferably 7-8 weight percent of the composition. Component (c) brominated polystyrene will comprise 2.5-8 weight percent and preferably 4-6 weight percent of the composition. Component (d) sodium antimonate will comprise 0.5-2.5 weight percent and preferably 1.0-1.5 weight percent of the composition.

The polyarylates used in the compositions of the invention are aromatic polyesters derived from one or more dihydric phenols and one or more aromatic dicarboxylic acids. The dihydric phenol can be a bisphenol as described in U.S. Pat. No. 4,187,358 as structure 1:

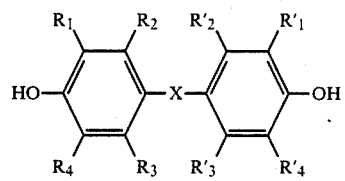

wherein —X— is selected from the group consisting of nothing, —O—, —S—, —SO$_2$—, —SO—, —CO—, an alkylene group containing 1 to 3 carbon atoms, and R$_1$, R$_2$, R$_3$, R$_4$, R$_1'$, R$_2'$, R$_3'$ and R$_4'$, which may be the same or different, each is selected from the group consisting of a hydrogen atom, a chlorine atom, and a bromine atom.

Suitable examples of alkylene groups for X containing 1 to 3 carbon atoms include a methylene group, an ethylene group and a propylene group.

Additionally, up to 40 mole % of dihydric mono nuclear phenols of the formula:

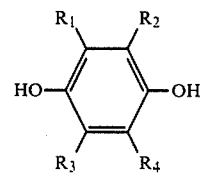

may be used in combination with the bisphenols wherein R$_1$–R$_4$ are as previously described.

Preferably, a mixture of 90 to 0 mole % of terephthalic acid and/or the functional derivatives thereof and 50 to 100 mole % of isophthalic acid and/or its functional derivatives is used as the acid component to be reacted with the bisphenol to prepare the polyarylate used in the compositions of the present invention. More preferably, a mixture of 0 to 30 mole % of terephthalic acid and/or the functional derivatives thereof and 100 to 70 mole % of isophthalic acid and/or the functional derivatives thereof is used. Polyarylate prepared from a bisphenol as described above and a mixture of 10-0 mole % of terephthalic acid and/or the functional derivatives thereof and 90-100 mole % of isophthalic acid and/or the functional derivatives thereof is most preferred. The molar ratio of the bisphenol to the sum of the terephthalic acid units and isophthalic acid units is substantially equimolar, e.g., about 1:0.95 to 1.2, preferably about 1:1, most preferably 1:1. Aromatic hydroxy acids such as hydroxy benzoic or hydroxy naphthoic acid and other dicarboxylic acids can also be incorporated into the polyarylate structure as a minor component.

Examples of functional derivatives of terephthalic or isophthalic acid which can be used in this invention include acid halides and diaryl esters. Preferred examples of acid halides include terephthaloyl dichloride, isophthaloyl dichloride, terephthaloyl dibromide and isophthaloyl dibromide. Preferrred examples of diaryl esters include diphenyl terephthalate and diphenyl isophthalate.

Examples of suitable bisphenols are 4,4'-dihydroxydiphenyl ether, bis(4-hydroxy-2-methylphenyl)ether, bis(4-hydroxy-3-chlorophenyl)ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenyl)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 3,3,3',3'-tetramethylspirobis-1,1'-indane-6,6'-diol. 2,2-Bis(4-hydroxyphenyl)propane is most preferred.

Typical examples of the functional derivatives of the bisphenol which can be used are the alkali metal salts and diesters with aliphatic monocarboxylic acid containing 1 to 3 carbon atoms. Suitable examples of aliphatic monocarboxylic acids include formic acid, acetic acid, propionic acid, etc. Preferred functional derivatives of the bisphenols are the sodium salts, the potassium salts, and the diacetate esters.

The bisphenol can be used either individually or as a mixture of two or more. Further, mixed salts or mixed carboxylate esters may be used.

To change the reactivity and possibly the stability of the polyarylate, monofunctional components can be included in the polyarylate to limit molecular weight or reduce the proportions of reactive ends.

Polyarylates useful in the compositions of the present invention can be prepared by any of several known methods. The interfacial polymerization method comprises mixing a solution of an aromatic dicarboxylic acid chloride in a water-immiscible organic solvent with an alkaline aqueous solution of bisphenol. The solution polymerization method comprises heating bisphenol and a diacid dichloride in an organic solvent. One melt polymerization method comprises heating a diphenyl ester of an aromatic dicarboxylic acid and bisphenol. An alternate melt polymerization method comprises heating aromatic dicarboxylic acid and a diester (e.g., the diacetate ester) of bisphenol. These methods are described in detail in U.S. Pat. Nos. 3,884,990, 3,946,091, 4,052,481 and 4,485,230.

The epoxy functional polymer, component (b), is any of those polymers which contain a plurality of oxirane moieties including polymers and copolymers prepared by polymerizing an oxirane group containing monomer and those polymers in which the oxirane function is introduced subsequent to formation of the polymer chains as, for example, by epoxidation of pendant or main chain double bonds. The latter include epoxidized products of polymers such as polybutadiene or poly(styrene butadiene) or their partially hydrogenated derivatives. It also includes the epoxidized derivatives of EPDM rubbers.

In order to insure acceptable physical properties of products molded from the compositions of the present invention, including flame retardancy, and also acceptable processability of such compositions, the polyarylate should have a logarithmic viscosity number ($\eta_{inh}$ or IV), defined by the following equation, of about 0.40 to 0.52, preferably 0.45–0.50, $$\eta_{inh} = \frac{\ln t_1/t_2}{C}$$

wherein $t_1$ is the falling time (in seconds) of a solution of the polyarylate, $t_2$ is the falling time (in seconds) of the solvent; and C is the concentration (g/dl) of the polyarylate in the solution. The logarithmic viscosity number used herein is determined in a trifluoroacetic acid-methylene chloride mixture (25/75 by volume) at 30° C. The procedure is further described in Textbook of Polymer Science by F. Billmeyer, p. 79 (John Wiley & Sons, 1962).

The preferred epoxy functional polymer is a copolymer of ethylene, 0–40% alkyl(meth)acrylate, 0.6–5% glycidyl methacrylate. More preferably, component (b) is a copolymer of ethylene, with 0–30% butyl acrylate and 1–3% glycidyl methacrylate (GMA).

The melt index (ASTM D-1238, condition E) of component (b) may vary from 0.5 to 50, preferably from 5 to 20, most preferably from 8 to 15.

The brominated polystyrene, component (c), is tribrominated polystyrene, i.e., the bromine content of component (c) is about 68% by weight. The brominated polystyrene should be substantially stable at processing conditions, e.g., melt temperatures up to 350° C., and should not cause degradation of the polyarylate.

Other additives as are known to those familiar with polymer compounding may be included in the composition. These additives include stabilizers including phosphites, antioxidants, reinforcing agents such as glass fiber and flake, conductive carbon, minerals, and ultra-violet light stabilizers.

In all processing operations, it is important to dry the components of the thermoplastic product sufficiently to minimize unwanted hydrolytic degradation. Operating temperatures should also be selected consistent with obtaining a fluid melt but minimizing thermal degradation of the composition and its components.

The melt mixing of the four components of the composition of the present invention can be carried out in any of the polymer melt mixing devices which are known to those skilled in the art as being capable of generating sufficient heat and shear to melt and adequately mix the starting materials. For example, the polymers can be mixed in an internal mixer such as a Brabender Mixer, in a Farrel Continuous Mixer (FCM), in a Buss Kneader, in a single screw extruder, or preferably in a twin screw extruder. It is preferable when mixing polymers at high temperatures to protect them from exposure to air by using a blanket of inert atmosphere around the openings or ports of the mixing device.

Blending in a single screw extruder is accomplished by feeding a physical mixture of the components to be blended to an extruder which has been fitted with a screw that develops sufficient energy to melt and mix the components. The screw may be of a single-stage design for use in an unvented barrel or of a two-stage design for use with a vented barrel. Barrier or special mixing screws are especially preferred. The barrel temperature settings would be selected to provide the desired melt temperature and a screw speed selected within the normal operating range of the machine, usually near the upper end of the range. The product exiting the die is normally pelletized if it is to be remelted in a subsequent step.

The compositions of this invention may also be compounded in a twin-screw extruder. The ZSK series machines made by the Werner & Pfleiderer Company are examples of suitable twin-screw machines. These machines employ two intermeshing co-rotating screws which are assembled from various elements into a suitable configuration. The selection of a screw configuration is not critical to the invention. A typical configuration will use conveying elements to convey the feed material from the feed zone to a melting zone in which the material is compressed and melting begins. A section of "kneading blocks" followed by "reverse elements" next provides high shear and pressure to further the melting and mixing processes which permit the various reactions to begin. If the extrusion is to be conducted under vacuum, the reverse elements serve also to provide a melt seal following which the melt will be decompressed in the section under vacuum. Following the vacuum zone, the screw recompresses the melt and continues the dispersion process and may optionally again pass it through kneading blocks and reverse elements which, if present, also serve as a vacuum seal for this side of the vacuum zone. The melt is then further compressed and mixed as it passes through the end of the extruder and out the die. The die may be designed to form an end use shape directly, i.e., a profile, sheet or parison, or it may produce strand for pelletizing the product. In a machine such as a Baker-Perkins, the melt from the twin-screw mixer will be discharged to a single-screw extruder or other melt pump for pelletizing or shaping.

The composition of the present invention may be processed into useful objects by the many fabricating processes known to those familiar with the art of fabricating thermoplastics including direct extrusion, thermoforming, blow-molding and injection molding.

As indicated above, it may be formed into a useful shape directly exit the compounding extruder. Such shapes include, but are not limited to, sheets, film, rods, tubes, various profile shapes, coatings, and parisons for blow molding. These same products can, of course, also be made in the more usual manner by re-extruding pre-compounded product.

The compounded product will more typically be used to injection mold end-use objects. In this process the product of the invention in pellet form is introduced to the melting zone of a molding machine and converted to a fluid melt under the action of shear, applied heat and compression. The melt is then transferred (injected) under pressure to a cooler mold and allowed to solidify.

The physical properties of the molded articles may depend on the manner in which it is fabricated. This is known to those skilled in the art of fabricating thermoplastics containing dispersed phases. Processing parameters such as melt temperature, mold temperature, melt flow paths, melt shear rates, mold fill times, and part thickness all influence many of the physical properties of a fabricated object. These parameters must be considered as one selects and optimizes a fabricating process to produce a desired balance of properties.

In the following Examples, the polyarylate used was a resin made from 2,2'-bis(4-hydroxyphenyl)propane and commercially available isophthalic acid via the diacetate of the bis-phenol. It had an I.V. of 0.49. The epoxy-containing polymer was an ethylene/n-butyl acrylate/glycidal methacrylate (73.6/25.0/1.4 wt. %) terpolymer (EBAGMA). The brominated polystyrene was commercially available tri-brominated polystyrene (TBP). Each of the compositions in the following Example also contained 0.1 weight percent of N,N-hexamethylene bis(3,5-di-tert-butyl-4-hydroxyhydrocinnanamide) and 0.2 weight percent of 1,3,5-trimethyl-2,4,6-tris[3,5-di-tert-butyl-4-hydroxybenzyl]benzene.

In the following Examples, all the components were dry blended and extruded together through a 28 mm Werner & Pfleiderer twin-screw extruder in a single step. The extrudates were injection molded into test bars of ⅛"×5"×1/16" thickness on a 6 oz. injection molding machine.

The test bars were then subjected to the UL Verticle Burning Test to Classifying Materials 94 V-0, 94 V-1 or 94 V-2, except that specimen conditioning was done according to condition 3.9A only, namely, the specimens were conditioned for at least 48 hours at a temperature of 23°±2° C. and a relative humidity of 50± 5 percent prior to testing. The specific compositions (in weight %) and flammability performance of each blend is shown in the following Table.

Samples 4, 7 and 10 achieved the best (V-0) flammability rating (total burning time <50 seconds and no dripping for the five specimens tested). Samples 1, 3, 6 and 9 each achieved the lower (V-2) rating because of dripping of some specimens which ignited dry surgical cotton placed 12 inches below the test bar. Samples 2, 5 and 8 failed the test because of dripping and a total burning time exceeding 250 seconds for the five specimens tested.

TABLE

| Sample | EBAGMA | TBP | Na Antimonate | UL94 Rating |
| --- | --- | --- | --- | --- |
| 1 | — | — | — | V-2 |
| 2 | 7.5 | — | — | fail |
| 3 | — | 5.0 | 1.25 | V-2 |
| 4 | 7.5 | 5.0 | 1.25 | V-0 |
| 5 | 5.0 | — | — | fail |
| 6 | — | 3 | 0.75 | V-2 |
| 7 | 5 | 3 | 0.75 | V-0 |
| 8 | 10 | — | — | fail |
| 9 | — | 8 | 2.0 | V-2 |
| 10 | 10 | 8 | 2.0 | V-0 |

I claim:

1. A thermoplastic polyester composition consisting essentially of
   (a) 82-90 weight percent of at least one polyarylate which is the reaction product of at least one compound selected from dihydric phenols and derivatives thereof, and at least one compound selected from aromatic dicarboxylic acids and derivatives thereof,
   (b) 5-10 weight percent of at least one epoxy-containing polymer which is a copolymer of 55-99.3 weight percent ethylene, 0-40 weight percent of a monomer selected from alkyl acrylates and alkyl methacrylates and 0.7-5 weight percent of glycidyl methacrylate,
   (c) 2.5-10.0 weight percent of tribrominated polystyrene and
   (d) 0.625-2.5 weight percent of sodium antimonate, provided that the weight ratio of component (c) to component (d) is at least 4:1, the above weight percentages being based on the total of components (a), (b), (c) and (d) only, and the composition including physical mixtures of components (a), (b), (c) and (d) and mixtures of reaction products thereof.

2. The composition of claim 1 wherein the polyarylate is the reaction product of 2,2'-bis(4-hydroxyphenyl)propane and at least one compound selected from terephthalic acid, isophthalic acid and derivatives thereof.

3. The composition of claim 2 wherein ratio of isophthalic acid and derivatives thereof to terephthalic acid and derivatives thereof is 100:0-70:30.

4. The composition of claim 3 wherein the ratio is 100:0-90:10.

5. The composition of claim 1 wherein the polyarylate is the reaction product of 2,2'-bis(4-hydroxyphenyl)propane and isophthalic acid.

6. The composition of claim 1 wherein the epoxy-containing polymer is a copolymer of 67-84 weight percent ethylene, 0-30 weight percent butyl acrylate, and 1-3 weight percent glycidyl methacrylate.

7. The composition of claim 1 wherein component (a) comprises 85-87 weight percent of the composition.

8. The composition of claim 1 wherein component (b) comprises 7-8 weight percent of the composition.

9. The composition of claim 1 wherein component (c) comprises 4-6 weight percent of the composition.

10. The composition of claim 1 wherein component (d) comprises 1.0-1.5 weight percent of the composition.

11. The composition of claim 1 which consists essentially of
    (a) 85-87 weight percent of a polyarylate that is the reaction product of 2,2'-bis(4-hydroxyphenyl)propane and isophthalic acid,
    (b) 7-8 weight percent of copolymer of ethylene, 0-30 weight percent butyl acrylate and 1-3 weight percent glycidyl methacrylate,
    (c) 4-6 weight percent tri-brominated polystyrene, and
    (d) 1.0-1.5 weight percent sodium antimonate, physical mixtures thereof, and mixtures of the reaction products thereof.

* * * * *